(12) United States Patent
Shan et al.

(10) Patent No.: US 7,050,474 B2
(45) Date of Patent: May 23, 2006

(54) HIGH PEAK-POWER KILOHERTZ LASER SYSTEM EMPLOYING SINGLE-STAGE MULTI-PASS AMPLIFICATION

(75) Inventors: Bing Shan, Manhattan, KS (US); Chun Wang, Manhattan, KS (US); Zenghu Chang, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 286 days.

(21) Appl. No.: 10/656,343

(22) Filed: Sep. 5, 2003

(65) Prior Publication Data

US 2005/0053105 A1    Mar. 10, 2005

(51) Int. Cl.
*H01S 3/091* (2006.01)

(52) U.S. Cl. .......................... 372/70; 372/99
(58) Field of Classification Search .................. None
See application file for complete search history.

(56) References Cited

U.S. PATENT DOCUMENTS

| | | | |
|---|---|---|---|
| 5,172,263 A | 12/1992 | Hale | |
| 6,108,357 A | 8/2000 | Unternahrer | |
| 6,384,966 B1 | 5/2002 | Dymott | |
| 6,700,905 B1 * | 3/2004 | Karasawa et al. | 372/21 |
| 2003/0193975 A1 * | 10/2003 | Pang | 372/25 |

OTHER PUBLICATIONS

Spectra-Physics Mountain View, California HURRICANE Specifications (Oct. 2001).
Positive Light Los Gatos, California Legend Sub-30 fs Ti:sapphire Amplifier (Jan. 2003).
Positive Light, Inc. Los Gatos, California Technical Bulletin "Overcoming Challenges of Sub-30 fs Chirped Pulse Amplification" (Jan. 2003).
Spectra-Physics, Mountain View, California FEMTOPOWER Compact PRO Specifications (1997).
J. Squier et al, "100-fs pulse generation and amplification in Ti:Al2O3", Optics Letters, 16, 324 (1991).

(Continued)

*Primary Examiner*—Minsun Oh Harvey
*Assistant Examiner*—Tod T. Van Roy
(74) *Attorney, Agent, or Firm*—Howard M. Cohn

(57) ABSTRACT

The present invention describes a technique for achieving high peak power output in a laser employing single-stage, multi-pass amplification. High gain is achieved by employing a very small "seed" beam diameter in gain medium, and maintaining the small beam diameter for multiple high-gain pre-amplification passes through a pumped gain medium, then leading the beam out of the amplifier cavity, changing the beam diameter and sending it back to the amplifier cavity for additional, high-power amplification passes through the gain medium. In these power amplification passes, the beam diameter in gain medium is increased and carefully matched to the pump laser's beam diameter for high efficiency extraction of energy from the pumped gain medium. A method of "grooming" the beam by means of a far-field spatial filter in the process of changing the beam size within the single-stage amplifier is also described.

17 Claims, 6 Drawing Sheets

OTHER PUBLICATIONS

M. Lenzner et al, "Sub-20-fs, kilohertz-repetition-rate Ti:sapphire amplifier", Optics Letters, 20, 1397(1995).

Fu et al, "High-average-power kilohertz-repetition-rate sub-100fs Ti:sapphire system", Optics Letters,712(1997).

V. Bagnoud and F. Salin, "1.1 Terawatt, kilohertz femtosecond laser", in conference on Lasers and Electro-optics, 1999, Baltimore, 1vID.

S. Sartania et al., "Generation of O.I-TW 5-fs optical pulse at a 1-kHz repetition rate", Opt. Lett. 22, 1562(1997): 1 stage amplifier: 1.5mJ output/10 mJ pump.

Y. Jiang et al., "High-average-power 2-kHz laser for generation of ultrafast x-ray pulses", Opt. Lett. 27,963(2002): 3 stage amplifier, 2kHz: 1 -3uJ output/1.5W pump; 2-0.5 mJ output/11 W pump; 3-14W output/54W pump.

* cited by examiner

HIGH PEAK-POWER KILOHERTZ LASER SYSTEM EMPLOYING SINGLE-STAGE MULTI-PASS AMPLIFICATION

GOVERNMENT SUPPORT

This research was funded by Department of Energy grant no. DE-FG03-02ER15285/A001.

TECHNICAL FIELD

The present invention relates generally to laser systems and more particularly to pulsed laser systems operating in the kilohertz (kHz) range of repetition rates.

BACKGROUND ART

Despite their relatively recent introduction, ultrafast (e.g., femtosecond-range pulse-width) high-intensity lasers are rapidly becoming important tools for both research and industry. Such laser systems are often referred to as "Ultrafast Kilohertz" lasers (or kHz lasers), referring to their pulse repetition rate in the kilohertz range, or as "femtosecond" (fs) lasers, referring to their very short pulse width, anywhere from tens to hundreds of femtoseconds (1 fs=$10^{-15}$ seconds, or one one-thousandth of a picosecond). Only a little over decade after their invention, there are thousands of such lasers operating worldwide in research and industrial applications.

New applications for kHz femtosecond lasers are constantly demanding ever-higher levels of laser energy/peak power from the kHz laser. In response, manufacturers of such lasers continually improve their products to meet the market demand. Modern state-of-the-art commercial kHz femtosecond Ti:Sapphire lasers are capable of producing pulses of 2.5 mJ per pulse at 1 kHz using a two-stage pulse amplification system (1 mJ 1 millijoule or $10^{-3}$ Joules). Systems that employ single-stage amplification systems are typically limited to pulse output levels of 1.0 mJ to 1.5 mJ per pulse.

Peak output power is defined as the ratio of pulse energy to pulse duration (pulse width). Accordingly, short pulse width (pulse duration) is an important, even critical, factor in achieving high peak output power. Many "high-power" lasers produce high pulse energy, but at a "wider" (relatively speaking) pulse width on the order of 100 fs, thereby reducing their peak output power considerably compared to peak output power levels that would be achieved if the same pulse energy was delivered in a shorter pulse (e.g., 20–30 fs—the pulse width produced by many "lower average power", kHz femtosecond lasers).

The first high-power femtosecond laser was developed in 1991 by J. Squier et al (J. Squier et. al, "100-fs pulse generation and amplification in Ti:Al$_2$O$_3$," Optics Letters, 16, 324 (1991)), using a single stage regenerative amplifier. It was capable of producing pulses of 1.1 mJ at a pulse width of 105 fs. Its peak output power is $10^{10}$ W, and exhibited amplifier efficiency of 20%.

Although regenerative amplifiers facilitate high output pulse energy and high overall efficiency, they do not produce "ultrashort" pulses easily (i.e., pulses of significantly less than 100 fs in duration) because regenerative amplification introduces considerable high-order dispersion. Clark-MXR, Inc. of Dexter, Mich., a major provider of kHz femtosecond lasers, employs a single-stage regenerative amplifier in their current CPA2010 laser system, achieving output levels of 1 mJ and 150 fs per pulse at a repetition rate of 1 kHz.

In 1995, M. Lenzner et al developed a 1 kHz laser using a single-stage multi-pass amplifier that produced 0.1 mJ pulse energy and 18 fs pulse duration (M. Lenzner et al., "Sub-20-fs, kilohertz-repetition-rate Ti:sapphire amplifier", Optics Letters, 20, 1397 (1995)). The advantage of a multi-pass amplifier over a regenerative amplifier is that it is relatively easy to produce extremely short pulses because the multi-pass amplifier introduces considerably less material dispersion than the regenerative amplifier. However, it is difficult to achieve high efficiency due to the limited number of passes through the gain medium. A similar system is employed by Femtolasers GmbH of Vienna, Austria to deliver 30 fs, 1 mJ pulses at 1 kHz.

A two-stage system employing a regenerative amplifier followed by a multi-pass amplifier capable of 94 fs, 5 mJ pulses was reported by Fu et al. in 1996 (Fu et al., "High average-power kilohertz-repetition-rate sub-100 fs Ti:sapphire system", Optics Letters, 712 (1997)). Positive Light, Inc. of Los Gatos, Calif. produces a laser system using a similar design to produce 2.5 mJ, 30 fs pulses.

Researchers have built lasers using two or more stages of amplifiers to produce even higher peak power. The higher peak power produced to date by a kHz laser is $1.1 \times 10^{12}$ W (V. Bagnond and F. Salin, "1.1 Terawatt, kilohertz femtosecond laser", presented at "Conference on Lasers and Electro-optics", 1999, Baltimore Md.).

High power, kHz femtosecond lasers typically achieve high-power output pulses by amplifying a "small" laser seed pulse from a laser oscillator (a low-power seed pulse, typically on the order of nanoJoules (nJ)) to pulse energy on the order of mJ. This amplification is usually accomplished by means a population inversion in a gain medium produced by directing a pump laser at the gain medium. The seed pulse is passed through inverted gain medium to gain energy, thereby achieving pulse amplification.

To amplify a signal from the nJ level to the mJ level requires total power amplification of approximately 1,000, 000:1. It is not possible to achieve such great amplification in a single pass through a gain medium. Even under the best of circumstances, single-pass amplification is on the order of 10:1 and is typically lower. High levels of pulse amplification are achieved by directing the seed pulse through the inverted gain medium in multiple passes, each time gaining in energy. For very high power systems, a second stage amplifier is typically employed, with the first stage providing high gain pre-amplification and the second stage providing power amplification.

When compared to lasers of comparable power output and efficiency, lasers using a single-stage architecture are less expensive, easier to manufacture and easier to operate than those employing two or more stages of amplification. Lasers that employ a single-stage amplifier use considerably fewer parts. The simplicity of single-stage amplifier design eliminates the cost of additional stages of amplification, which could be up to $30,000 to $40,000 per stage, including optics, crystal (gain medium), mount, vacuum parts, optical table, etc. If a second-stage amplifier requires one or more additional pump lasers, the savings is even greater. The cost of a typical pump laser (Positive Light Evolution-30) is about $90,000/20 mJ and approx. $10,000/year for maintenance.

However, present-day laser systems employing single-stage amplification are generally limited to "medium" power output, typically on the order of 1–2 mJ. The potential for damage to the gain medium limits the maximum power output of a typical single-stage amplifier. In order to achieve high gain in a single stage, a very tight focus is employed to maintain a very small effective beam diameter through the gain medium. The signal (pulse) beam is be directed through the highest-gain portion of the pumped volume of the medium (the central portion thereof), achieving single-pass gain levels on the order of 10:1. Unfortunately, however, this technique takes advantage of only a small portion of the inverted gain medium, and achieves relatively low conversion efficiency from pump energy to output pulse energy, typically about 15%. Output stability tends to be poor because of the low efficiency. Further, because of the tight focus, energy density within the gain medium is very high, greatly increasing the risk of damage to the gain medium at higher output power levels.

A typical prior-art high-power pulse laser system employs a multi-stage architecture whereby a low power seed pulse (on the order of nanojoules) is passed through a high-gain preamplification stage and boosted to medium power levels, then through a power amplification stage to produce high output power.

By way of example, a 3-stage system is described by Y. Jiang et al. (Y. Jiang et al, "High-average-power 2-kHz laser for generation of ultrafast x-ray pulses", Optical Letters, 27, 963 (2002)) produces 1–3 uJ output at 2 kHz with a 1.5 W pump, 2–2.5 mJ output with an 11 W pump; 3–14 W output with a 54 W pump. The system employs two pre-amplifier stages followed by a single power amplification stage. The efficiencies of the three stages are 0.4%, 4.5% and 26%, respectively. Risk of damage to the gain medium is reduced because the amplification is not all achieved in the same stage (The small-signal single pass gain in the first stage is approximately 7:1). The output stability is good because of high efficiency and gain saturation in the final power amplification stage.

ADVANTAGES OF THE INVENTION

It is a therefore a primary advantage of the present invention is to increase the levels of peak output power and energy conversion efficiency that can be produced by a single-stage laser pulse amplifier while maintaining the capability of achieving high repetition rate (in the kilohertz range) and ultra-short pulse width (e.g., approx. 20–25 fs). Peak output power is defined as the ratio of the pulse energy to the pulse duration.

It is a further advantage of the present invention to reduce the cost (both purchase cost and maintenance cost) of high peak power, kilohertz femtosecond lasers.

It is a yet further advantage of the present invention to improve the ease of manufacture of high peak power, kilohertz femtosecond lasers.

It is a still further advantage of the present invention to improve the ease of use and maintenance of high peak power, kilohertz femtosecond lasers.

SUMMARY OF THE INVENTION

Accordingly, the present invention employs single-stage, multi-pass amplification to produce ultra-short pulse widths characteristic of single-stage systems, power output levels greater than those of many multi-stage systems, and high-efficiency. This is accomplished by employing a very small "seed" beam diameter, maintaining the small beam diameter for multiple high-gain "pre-amplification" passes through a pumped gain medium, then leading the beam out of the gain medium, changing the beam diameter to make it larger in the gain medium for one or more higher-power amplification passes. In the power amplification passes, the beam diameter is carefully matched to the pump laser's beam diameter for high efficiency extraction of energy from the pumped gain medium.

Additionally, the present inventive technique provides for "grooming" of the beam by means of a far-field spatial filter in the process of changing the beam size. During pre-amplification passes, slight non-uniformities of the gain medium and/or slight sub-millimeter scattering imperfections on optical surfaces can result in a non-uniform beam having small "filaments" of high beam intensity, or "hot spots". If not controlled, these "hot spots" can cause damage to the pumped gain medium. The process of spatial filtering results in a highly uniform beam without significant loss of beam power. Whereas spatial filtering is generally used between stages of multiple-stage amplifiers, the present invention employs a spatial filter within the single-stage, multi-pass amplifier.

According to the invention, a method of providing high peak power in a pulse laser system, comprises providing a low-power, pulsed seed beam having a small beam diameter and directing the seed beam for multiple pre-amplification passes through a pumped gain medium, such as a Ti:Sapphire crystal, thereby producing a pre-amplified intermediate beam. The intermediate beam is then directed through a lens system to change its effective beam diameter (re-collimated) and is re-directed through the gain medium for one or more additional power amplification passes to produce a high-power output beam. Typically, there will be a plurality of power amplification passes to achieve high output power levels and high efficiency.

According to one embodiment of the present invention, the signal beams in pre-amplification and power amplification paths travel at different heights along same path in opposite directions, thereby permitting use of a common retro mirror system to guide beams during both pre-amplification and power amplification passes.

According to another embodiment of the invention, the number of pre-amplification passes is seven (7) and the number of power amplification passes is seven (7) for a total of fourteen passes through the gain medium.

According to an aspect of the invention, the intermediate beam can optionally be "groomed" (spatially filtered) while changing the effective beam diameter. This can be accomplished by means of any suitable spatial filtering device, such as an aperture disposed at a focal point in a re-collimating lens system. The aperture acts as a far-field spatial filter to eliminate high-intensity "filaments" within the beam, thereby producing a more uniform beam intensity profile.

According to another aspect of the invention, the beam diameter is tightly focused during pre-amplification passes, and directed through a high-gain central portion of the pumped region of the gain medium.

According to another aspect of the invention, the beam diameter is closely matched to the diameter of the pumped region of the gain medium for power amplification passes to distribute beam energy over substantially the whole pumped region of the gain medium, thereby permitting high-efficiency energy extraction.

BRIEF DESCRIPTION OF THE DRAWINGS

These and further features of the present invention will be apparent with reference to the following description and drawings, wherein.

DETAILED DESCRIPTION OF THE INVENTION

Figure 1:
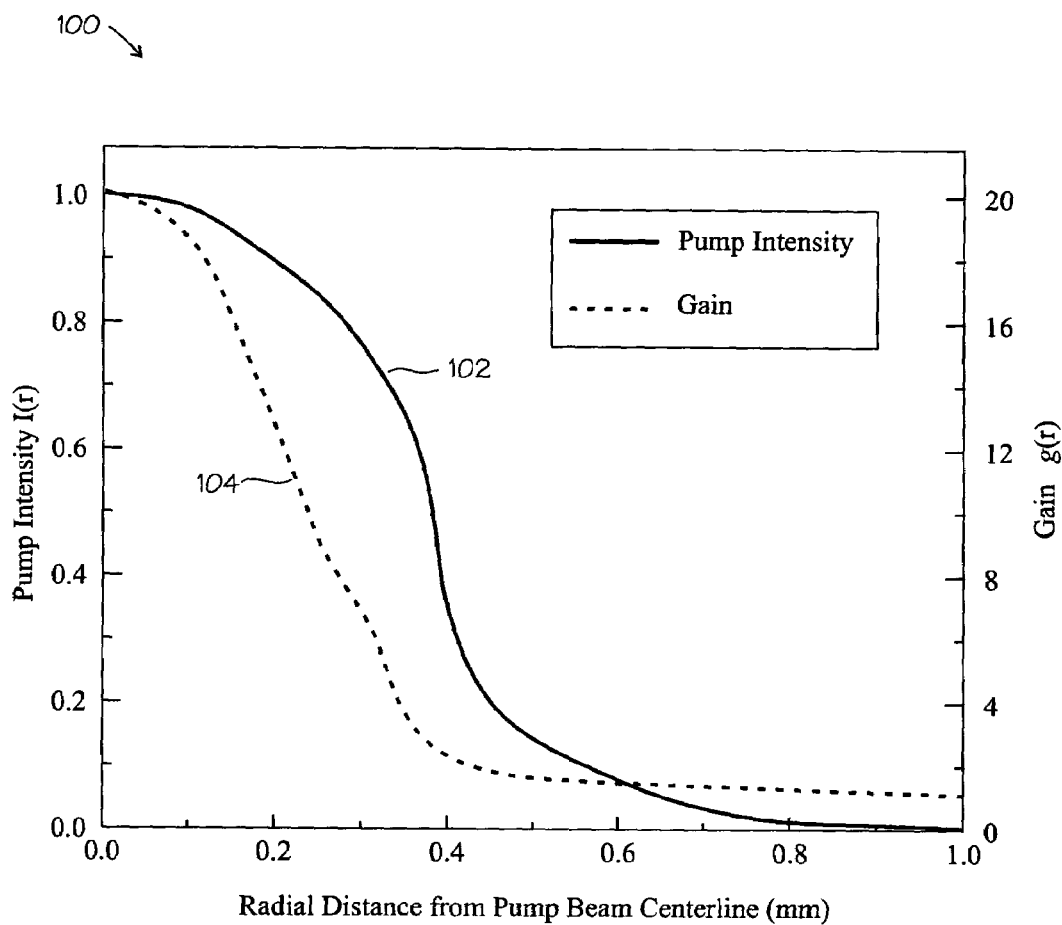
FIG. 1 is a graph relating pump beam intensity I(r) and single-pass signal gain g(r) to radial distance from the pump beam center, in accordance with the invention.

In the detailed description that follows, identical components have been given the same reference numerals, regardless of whether they are shown in different embodiments of the present invention. To illustrate the present invention in a clear and concise manner, the drawings may not necessarily be to scale and certain features may be shown in somewhat schematic form.

A primary object of the present invention is to increase the levels of peak output power and energy conversion efficiency that can be produced by a single-stage laser pulse amplifier while maintaining the capability of achieving high repetition rate and ultra-short pulse width (e.g., approx. 20–25 fs). Peak output power is defined as the ratio of the pulse energy to the pulse duration.

When compared to lasers of comparable power output and efficiency, a laser using a single-stage amplifier is cheaper, easier to manufacture and operate than those employing two or more stages of amplification.

According to the invention, a pumped gain medium is provided whereby pump laser is directed into a gain medium (e.g., a laser crystal such as Ti:Sapphire) producing a pumped region within the gain medium wherein inversion occurs (inversion region). A "seed" pulse from a femtosecond laser oscillator (stretched to tens of picoseconds long) with a small beam diameter is then directed through a central portion of the pumped region where the gain is highest. The amplified signal beam is then redirected through the gain medium for several additional passes of high-gain preamplification. Next, the effective signal beam diameter in the gain medium is increased to more closely match the pump beam diameter for one or more subsequent power amplification passes through the gain medium so that pump energy can be efficiently extracted.

In a laser gain medium such as a pumped Ti:Sapphire crystal, effective gain is not uniform throughout the entire volume of the pumped region of the medium. Gain distribution is heavily dependent upon the pump laser's beam intensity profile, which is greatest at the center of the pump laser beam, and decreasing with increasing distance from the centerline towards the perimeter of the beam. This is shown in FIG. 1.

FIG. 1 is a graph 100 relating pump beam intensity I(r) (as shown by a pump intensity contour line 102) and single-pass signal gain g(r) (as shown by a gain contour line 104) to radial distance from the pump beam center, in accordance with the invention. The pump beam intensity line 102 shows the normalized intensity I(r) of a representative pump laser beam as a function of distance from the beam's centerline. Beam intensity is the highest (1.0) at the center, decreasing gradually towards the periphery (perimeter) of the beam where it falls off rapidly. The gain contour line 104 is representative of the single-pass gain achieved by passing a very small-diameter signal beam through the pumped region. As the distance of the signal beam from the pump beam centerline (the center of the pumped region) increases, single-pass gain falls off dramatically, achieving highest gain when the signal beam is well aligned with the pump beam centerline in the pumped region of the gain medium.

However, even when the seed pulse is perfectly aligned to the pump beam centerline in the gain medium, gain is still heavily dependent of the diameter of the seed pulse beam itself. This is illustrated in FIG. 2.

Figure 2:
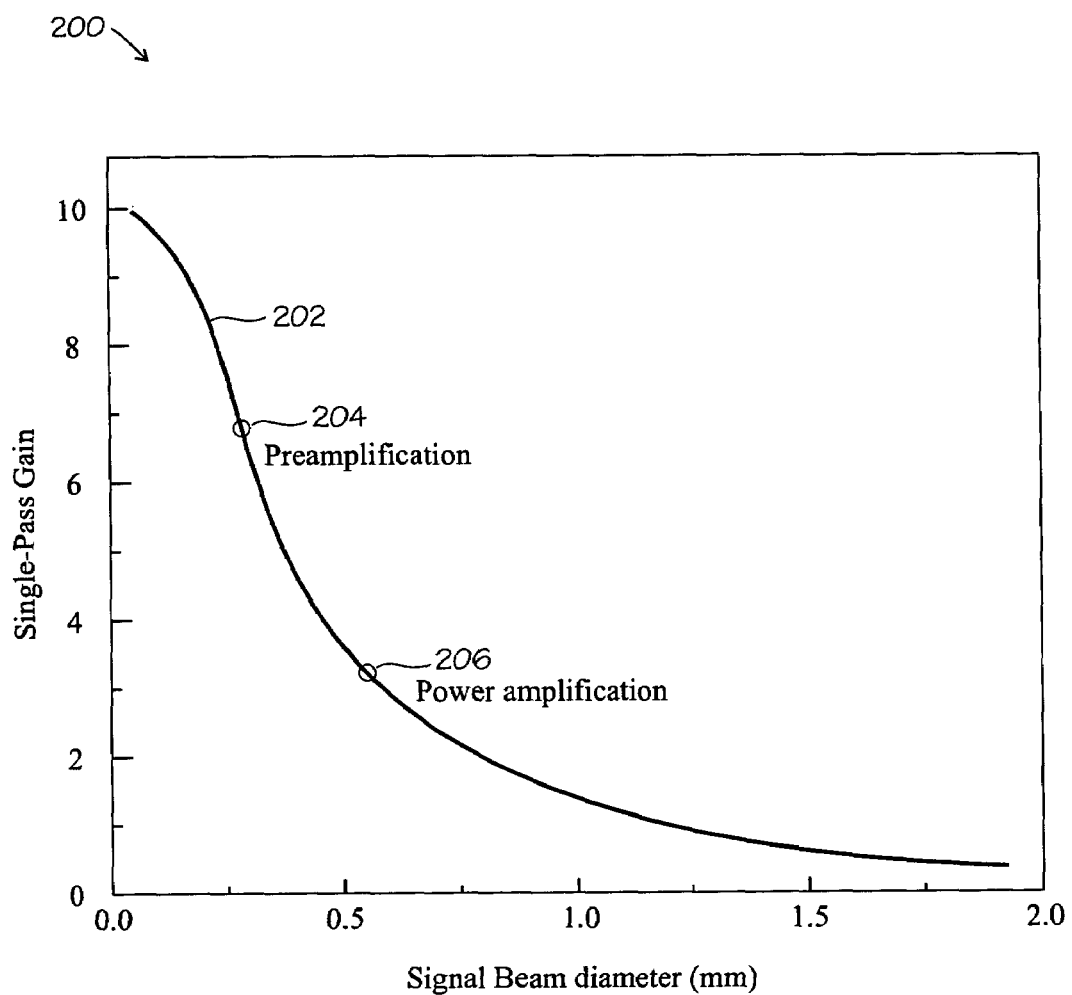
FIG. 2 is a graph relating signal gain to signal (pulse) beam diameter in the gain medium, in accordance with the invention.

FIG. 2 is a graph 200 relating single-pass signal (pulse) gain to signal (pulse) beam diameter, in accordance with the invention. A single-pass gain contour line 202 represents the relationship between single-pass gain (vertical axis) and signal beam diameter (horizontal axis), assuming perfect alignment with the pump beam centerline through the pumped gain medium. When the signal beam diameter is very small, the entire signal beam fits within the highest gain portion of the pumped region of the gain medium and relatively high gain is realized. As the signal beam diameter is increased, however, more of the signal beam extends outward into lower gain portions of the pumped region and gain decreases.

Although high gain can be achieved with extremely small signal beam size, as amplification (and accordingly, beam intensity) increase, the beam energy is applied to a very small volume of the gain medium, producing very high energy density levels within the crystal as compared to the same energy distributed over a larger volume (i.e., at a larger beam diameter). For this reason, it is not possible to achieve both high-gain and high-power in the same pass through the gain medium, due to the damage to the gain medium that by the high levels of energy density that would be produced by passing a high-energy signal beam through the gain medium at a small signal beam diameter. Power amplification is best achieved by utilizing a larger portion of the pumped volume, yielding lower gain but distributing beam energy over a larger volume of the pumped region, thereby reducing energy density within the gain medium and minimizing the risk of damage thereto. This is indicated in the graph 200 by two representative operating points 204 and 206. A first operating point 204 indicates a "Pre-amplification" position on the single-pass gain contour line 202 where small signal beam diameter (0.25–0.3 mm) yields relatively high gain (about 7:1 amplification), but utilizes only a small portion of the pumped volume of the gain medium, thereby limiting pulse energy levels. A second operating point 206 indicates a "Power Amplification" position on the single-pass gain contour line 202 where larger signal beam diameter (approx. 0.5–0.6 mm) yields lower gain, but produces greater utilization of the pumped volume of the gain medium, thereby permitting higher pulse energy levels.

Figure 3A:
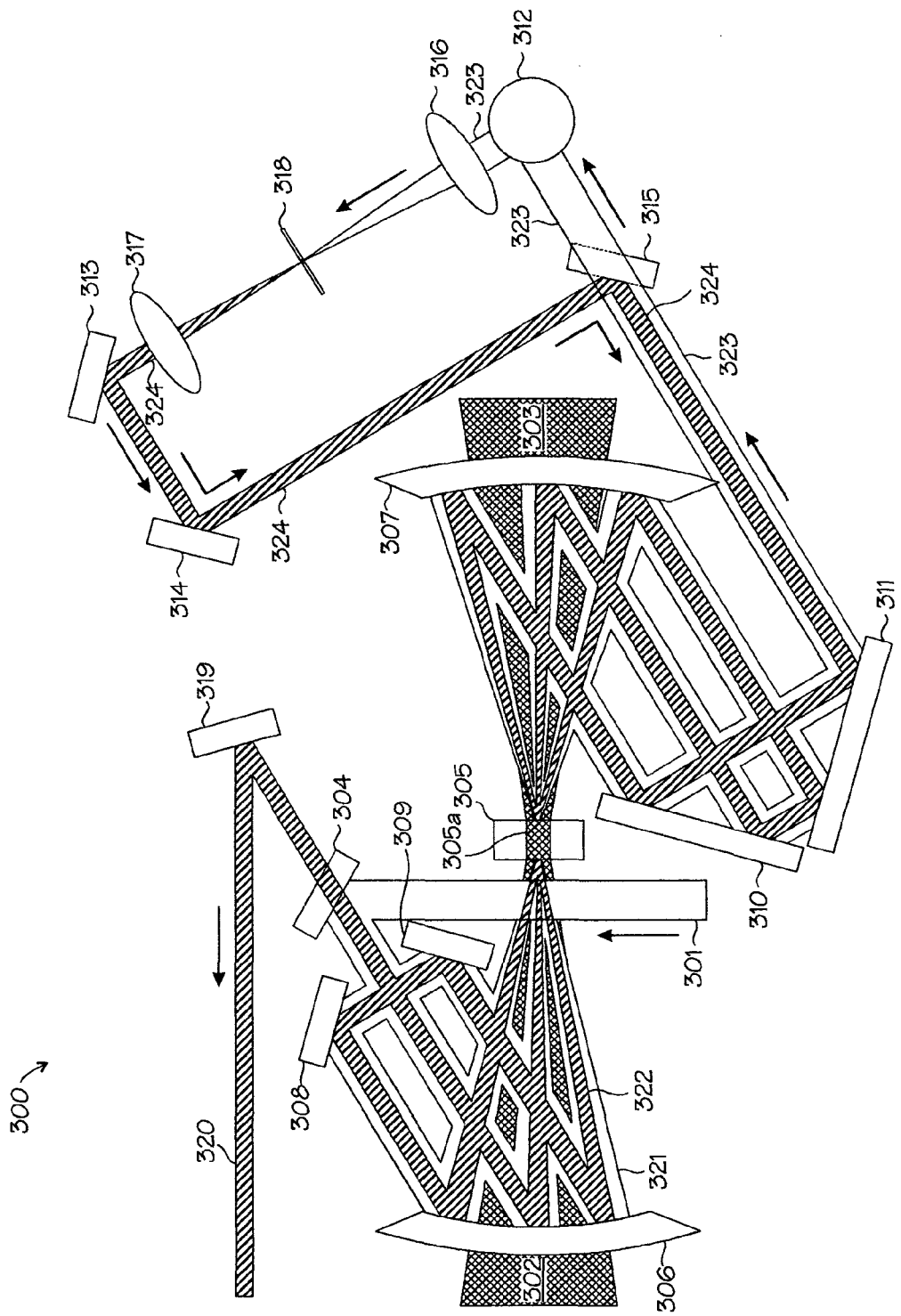
FIG. 3A is a schematic top view of a single-stage, multi-pass combined preamplifier and power amplifier, in accordance with the invention.

FIG. 3A is a schematic top view of an embodiment of a single-stage, multi-pass combined preamplifier and power amplifier 300, in accordance with the present inventive technique. The single-stage amplifier 300 amplifies an input signal beam 301 (indicated by a hollow outline in the Figure) by directing it in multiple passes through a gain medium 305 pumped by pump laser beams 302 and 303 to produce a high-power output beam 320. The pump beams 302 and 303 are directed at the gain medium 305 to produce inversion within a pumped volume (pumped region) 305a of the gain medium. The gain medium can be any suitable medium capable of producing laser amplification when pumped by a pump laser source. An example is a Ti:Sapphire crystal.

Upon entering the amplifier 300, the input signal beam 301 (preferably from a femtosecond laser pulse oscillator), encounters an input mirror 304, which directs the beam 301 towards a cavity end mirror 306, which in combination with another cavity end mirror 307 defines a cavity of the amplifier within which the gain medium 305 is disposed. The beam is guided for multiple, non-collinear pre-amplification passes 321 through the pumped volume 305a between the cavity end mirrors 306 and 307, gaining in amplitude with each subsequent pass. Retro mirrors 308, 309, 310 and 311 control the path and trajectory of the multiple internal passes (321) of the signal beam through the gain medium 305, ultimately guiding a resultant amplified intermediate beam 323 out of the cavity defined by the end mirrors 306 and 307. Upon exiting the cavity, the intermediate beam 323 encounters periscope 312 which shifts the intermediate beam 323 vertically (with respect to the plane of the page in FIG. 3A). This vertical displacement is shown and described in greater detail hereinbelow with respect to FIG. 3B. The periscope 312 directs the intermediate beam 323 through a lens system comprising lenses 316 and 317 to re-collimate the signal beam with a smaller beam diameter, thereby increasing its "effective" signal beam diameter through the pumped region 305a for subsequent power amplification passes. The re-collimated beam 324 is shown with diagonal hatching in the FIGS. 3A and 3B. An optional aperture 318, placed at a focal point between lenses 316 and 317, serves as a spatial filter to "groom" the intermediate beam 323 during re-collimation. As a result of spatial filtering, "filaments" or "hot spots" within the beam are "smoothed out", resulting in a re-collimated beam 324 with a highly uniform beam intensity profile. The re-collimated beam 324 is directed back into the cavity by means of mirrors 313, 314 and 315 and retro mirrors 310 and 311. The re-collimated internal beam is then directed for multiple non-collinear internal power amplification passes 322 through the pumped region 305a, gaining in amplitude with each subsequent pass. As with the pre-amplification passes, the path and trajectory of the power amplification passes 322 are controlled by the retro mirrors 308, 309, 310 and 311. Ultimately, the amplified beam is directed out of the cavity towards an output mirror 319 to produce an output beam 320.

Figure 3B:
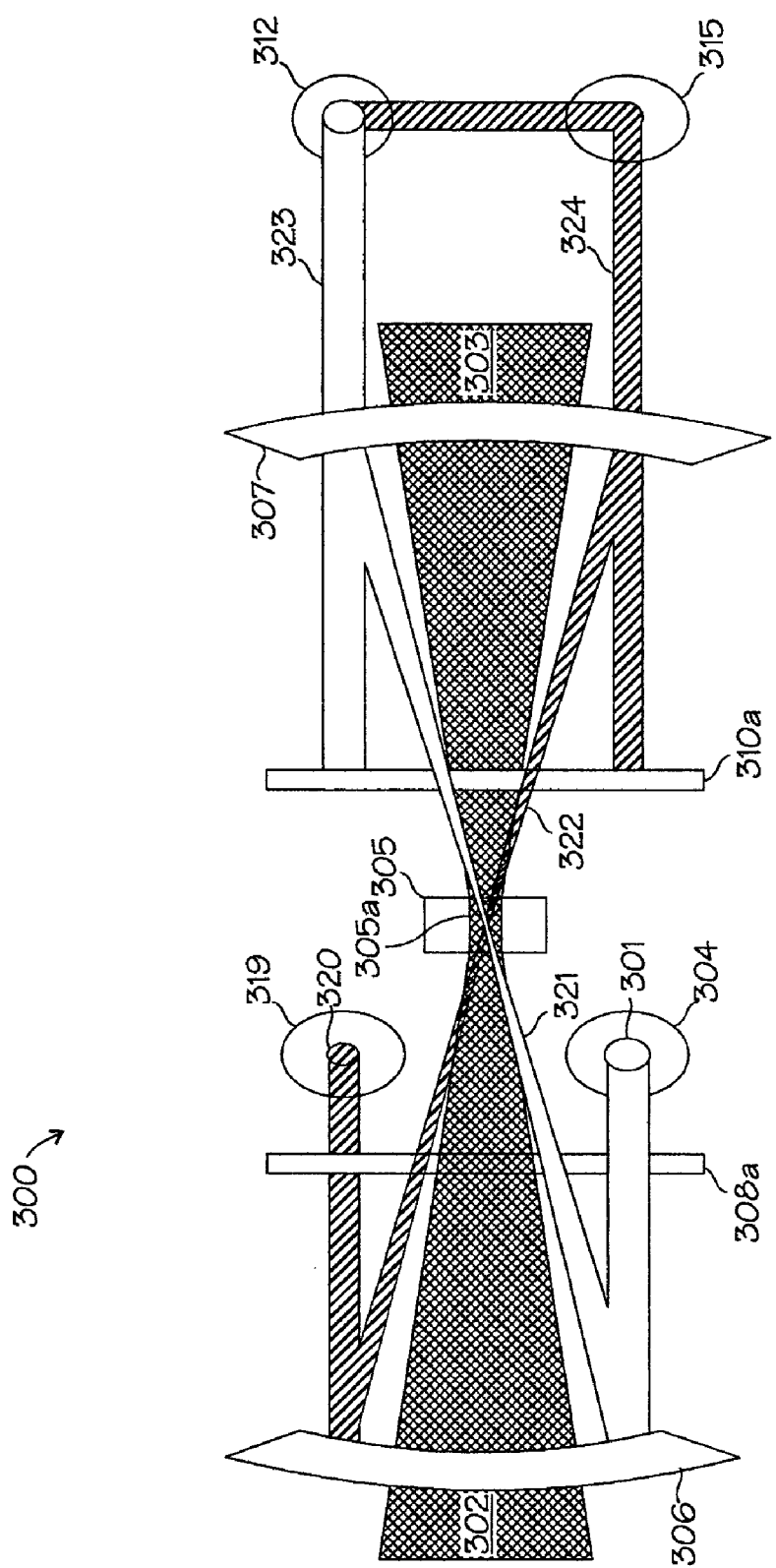
FIG. 3B is a schematic side view of the single-stage, multi-pass combined preamplifier and power amplifier of FIG. 3A, in accordance with the invention.

FIG. 3B is a schematic side view of the embodiment of a single-stage, multi-pass combined preamplifier and power amplifier 300 of FIG. 3A, in accordance with the invention. The main purpose of FIG. 3B is to illustrate the effect of vertical displacement by the periscope 312 of the re-collimated beam 324 with respect to the intermediate beam 323. Accordingly, for purposes of illustrative clarity, some elements of the amplifier 300 present in FIG. 3A are omitted in FIG. 3B. Retro mirror 308a in FIG. 3B is schematically representative of mirrors 308 and 309 in FIG. 3A, and retro mirror 310a in FIG. 3B is schematically representative of retro mirrors 310 and 311 in FIG. 3A.

It is well know to those of ordinary skill in the art that during pre-amplification passes, slight non-uniformities of the gain medium and/or slight sub-millimeter scattering imperfections on optical surfaces can result in a non-uniform beam intensity profile exhibiting small "filaments" of high beam intensity, or "hot spots". If not controlled, these "hot spots" can cause damage to the pumped gain medium at higher power levels. Optional aperture 318 acts as a far-field spatial filter to "groom" the beam, effectively reducing or eliminating these filaments and producing a more uniform beam profile.

It is noteworthy that the re-collimated beam 324 and output beam 320 are shown in FIGS. 3A and 3B as being generally smaller than the input beam 301 and intermediate beam 323. This is because the spot size produced by the beams on the cavity mirrors 306 and 307 is inversely proportional to the effective corresponding beam diameter when passing through the pumped region 305a of the gain medium 305. This is further shown and described hereinbelow with respect to FIG. 4.

Figure 4:
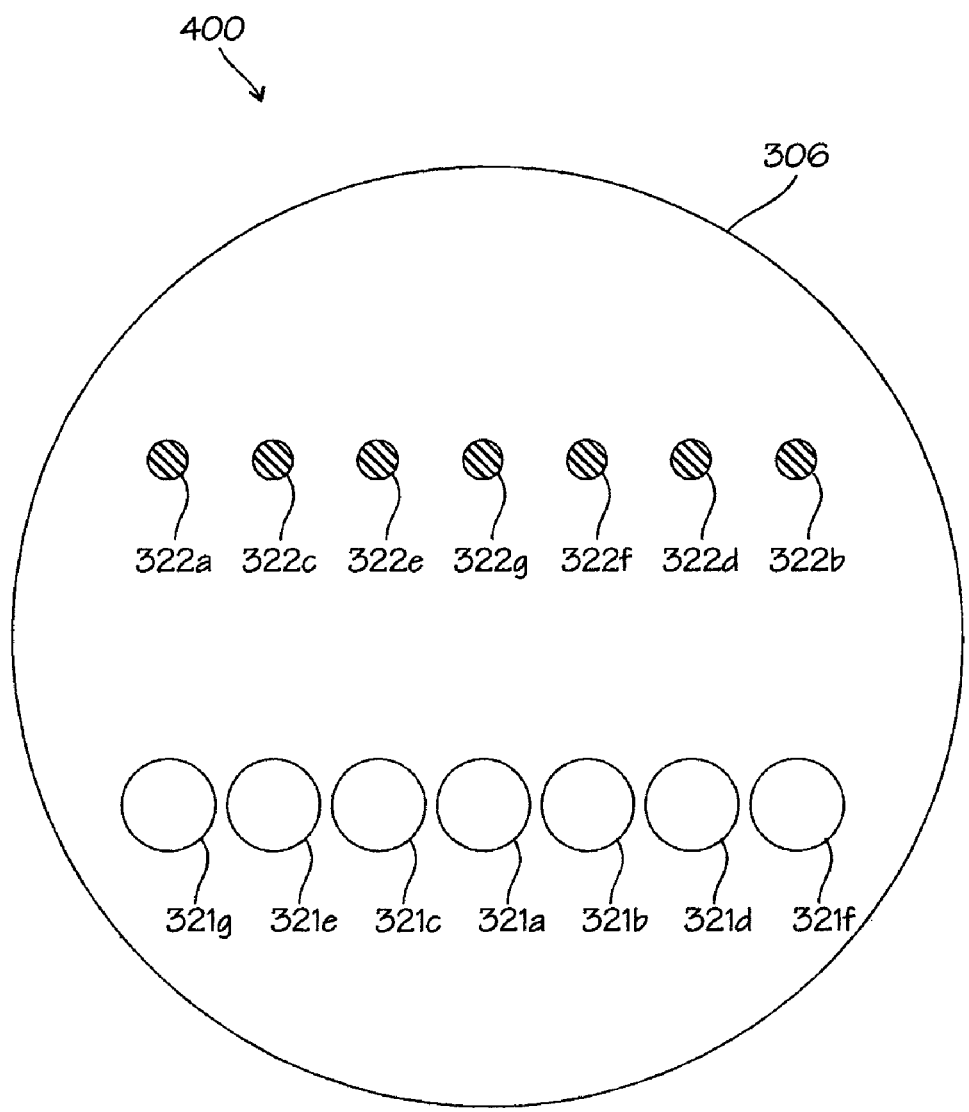
FIG. 4 is a diagram showing relative positions and beam sizes of multi-pass beam "spots" on a cavity end mirror in a single-stage combined preamplifier and power amplifier, in accordance with the invention.

FIG. 3A shows only six passes through the gain medium 305 (three pre-amplification passes and three power amplification passes). This is for illustrative clarity and to minimize "clutter" in the Figures. In one preferred embodiment, there are 14 total passes; seven pre-amplification passes and seven power amplification passes. FIG. 4 is directed to such a preferred embodiment. Those of ordinary skill in the art will immediately appreciate that only very minor changes to, for example, the orientations of the retro mirrors are required to increase the number of passes through the gain medium.

FIG. 4 is a diagram 400 showing relative positions of multi-pass beam "spots" 321x and 322x on cavity end mirror 306 (see FIGS. 3A, 3B) in a single-stage combined pre-amplifier and power amplifier of the type shown and described hereinabove with respect to FIGS. 3A and 3B, in accordance with the invention. In the case shown in FIG. 4, however, there are fourteen (14) total passes of the signal beam through the gain medium, producing spots 321x and 322x on the cavity end mirror 306. With the retro mirror arrangement shown in FIG. 3A, the pre-amplification spots 321a, 321b, 321c, 321d, 321e, 321f and 321g (in that order) begin at a central position, alternating left and right of center and increasing distance from the center with each subsequent pre-amplification pass. By way of contrast, beams spots 322a, 322b, 322c, 322d, 322e, 322f and 322g resulting from power amplification passes begin at a leftmost position, alternating right and left of center in subsequent passes, moving closer to an ultimate final central position after a final pass. Note again, as described hereinabove, that the beam spots 322x on the cavity mirror 306 due to power amplification passes are shown as being smaller than the spots 321x resulting from pre-amplification passes because the spot size on the cavity mirror is inversely proportional to the effective corresponding beam diameter passing through the gain medium for the embodiment shown and described herein.

Although not shown in the Figure, corresponding beam spots on the opposite cavity mirror (307) would appear in similar positions, but swapped top-to-bottom with respect to the spots on cavity mirror 306. There would also be a de facto left-to-right swap, as well, but viewing the opposite mirror face-on would have the effect of reversing the left-right swap.

Figure 5A:
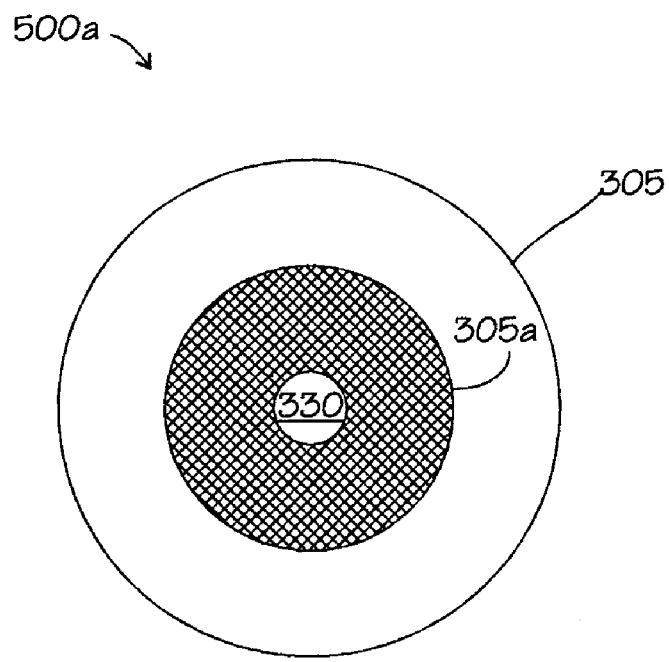
FIGS. 5A and 5B are diagrams showing a relationship between pump region diameter in a gain medium and signal beam diameter and position within the pump region for pre-amplification and power amplification passes, respectively, in accordance with the invention.

FIG. 5A is a diagram 500a showing the relationship between the diameter of a pumped region 305a of a gain medium 305 and the diameter of a signal beam 330 for high-gain pre-amplification.

Figure 5B:
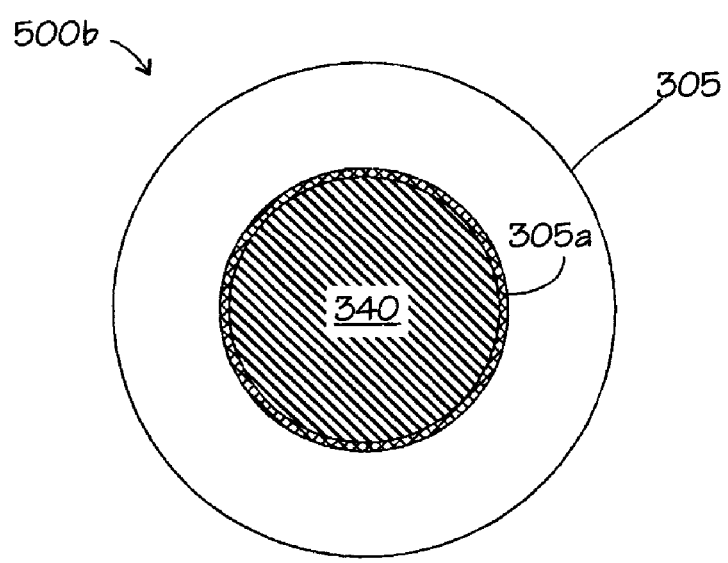

FIG. 5B is a diagram 500b showing the relationship between the diameter of the pumped region 305a of the gain medium 305 and the diameter of a signal beam 340 for power amplification.

In FIG. 5A, the signal beam 330 has a very small diameter, allowing it to pass exclusively through a central portion of the pumped region where the gain is highest, but concentrating the beam into a very small portion of the total pumped volume of the pumped region 305a. In FIG. 5B, the signal beam 340 has a very large diameter, closely matched to the diameter of the pumped region 305a, such that the signal beam is dispersed over substantially the whole pumped volume of the pumped region 305a, reducing gain but permitting higher beam energy levels without damage to the gain medium 305.

A specific 14-pass embodiment of the present invention (seven pre-amplification passes and seven power amplification passes) yields a single-stage multi-pass combined preamplifier and power amplifier that testing has shown to be capable of producing 4 mJ, 25 fs pulses. This results in peak output power from the inventive laser system of 4 mJ/25 fs, or $1.6 \times 10^{11}$ Watts.

The present inventive technique combines the advantages of separate pre-amplification and power amplification stages into a single-stage amplifier (Single-stage implying single gain medium). However, being a single-stage system, the present inventive technique eliminates the cost and complexity of additional-stage hardware, typically $30,000 to $40,000 per stage, including optics, crystal (gain medium), mount, vacuum parts, optical table, etc. If a subsequent-stage amplifier requires one or more additional pump lasers, the savings is even greater. The cost of a typical pump laser is about $90,000/20 mJ and approx. $10,000/year for maintenance.

Due to its relative simplicity (when compared to multi-stage lasers of comparable power output and efficiency), the present inventive technique produces lasers that are significantly less expensive, easier to manufacture and easier to operate. In addition, the present inventive technique permits single-stage laser systems to achieve performance specifications (ultra-short pulse width, high peak power, etc.) that exceed those of many multi-stage lasers.

Over and above the cost reduction achieved by eliminating subsequent stages, the present inventive technique produces laser systems that exhibit higher conversion efficiency than prior-art single-stage systems, thereby reducing the power required of the pump laser for any given output level. This permits the use of a smaller, lower-power pump laser. Given the extremely high cost of pump lasers (typically $90,000/20 mJ) this can yield significant additional cost savings. In the 14-pass embodiment referenced hereinabove, conversion efficiency is 26%, as compared to 16% for prior-art systems with comparable specifications. This represents a 39% reduction in the size (power) of the pump laser, potentially yielding a corresponding 39% savings in pump laser cost.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A method of providing high peak power in a pulse laser system, comprising:
    providing a low-power, pulsed seed beam;
    providing a pumped gain medium between cavity mirrors for creating a pumped region in the pumped gain medium;
    directing the seed beam through a central portion of the pumped region in the pumped gain medium for a plurality of non-collinear pre-amplification passes to produce an intermediate beam wherein the beam diameter of the pre-amplification passes is small in the pumped gain medium;
    changing the beam diameter of the intermediate beam to produce a re-collimated intermediate beam having a beam diameter in the pumped gain medium that is large; and
    using retro mirrors in combination with the cavity mirrors for directing the re-collimated intermediate beam through a central portion of the pumped region of the pumped gain medium for at least one non-collinear power amplification pass to produce a high-power output beam.

2. A method according to claim 1, further comprising:
    directing the re-collimated intermediate beam through a central portion of the pumped region of the pumped gain medium for multiple non-collinear power amplification passes to produce a high-power output beam.

3. A method according to claim 1, further comprising;
    spatially filtering the intermediate beam while changing its effective diameter.

4. A method according to claim 1, wherein:
    the number of power amplification passes is less than or equal to the number of pre-amplification passes.

5. A method according to claim 4, wherein:
    the number of pre-amplification passes is seven (7).

6. A method according to claim 1, further comprising:
    controlling the re-collimated intermediate beam for power amplification passes so that its am diameter in the pumped gain medium is closely matched to a diameter of the pumped region of the pumped gain medium.

7. A method according to claim 1, wherein:
    the pumped gain medium is a Ti:Sapphire crystal.

8. A single-stage, high peak-power femtosecond kilohertz laser system comprising:
    a pumped gain medium between cavity mirrors for creating a pumped region in the pumped gain medium;
    means for accepting an input pulse;
    means for directing the input pulse through a central portion of the pumped region in the pumped gain medium for a plurality of non-collinear pre-amplification passes to produce an intermediate beam wherein the beam diameter of the pre-amplification passes is small in the pumped gain medium;
    means for re-collimating the intermediate beam to produce a larger effective beam diameter in the pumped gain medium to produce a re-collimated intermediate beam; and means in combination with the cavity mirrors for directing the re-collimated intermediate beam through a central portion of the pumped region of the pumped gain medium for at least one non-collinear power amplification pass to produce a high-power output beam.

9. A system according to claim 8, further comprising:
means for directing the re-collimated intermediate beam through a central portion of the pumped region of the pumped gain medium for multiple non-collinear power amplification passes to produce a high-power output beam.

10. A system according to claim 8, further comprising:
a spatial filter for grooming the intermediate beam while changing its effective diameter.

11. A system according to claim 8, wherein:
the number of power amplification passes is less than or equal to the number of pre-amplification passes.

12. A system according to claim 11, wherein:
the number of preamplification passes is seven (7).

13. A system according to claim 8, further comprising:
means for closely matching the diameter of the re-collimated intermediate beam during power amplification passes through the pumped gain medium to a diameter of the pumped region of the pumped gain medium.

14. A system according to claim 8, wherein:
the pumped gain medium is a Ti:Sapphire crystal.

15. A single-stage, high peak-power femtosecond kilohertz laser system comprising;
a gain medium;
at least one pump laser beam creating a pumped region in the gain medium;
cavity mirrors disposed upon opposite sides of the pumped gain medium, defining a cavity within which multiple passes of a signal beam through the pumped gain medium can occur;
an input mirror for directing an input beam into the cavity, and retro mirrors in combination with the cavity mirrors to control beam path and trajectory for multiple non-collinear pre-amplification passes through a central portion of the pumped region to produce an intermediate beam;
a periscope for shifting an intermediate beam resulting from multiple pre-amplification passes;
a lens system for re-collimating the intermediate beam to produce a re-collimated intermediate beam with increased effective beam diameter in the pumped gain medium;
one or more minors for directing the re-collimated intermediate beam back into the cavity for one or more non-collinear power amplification passes through a central portion of the pumped region of the gain medium; and
an output mirror for directing a high-power beam out of the system.

16. A system according to claim 15, further comprising:
a spatial filter associated with the re-collimating lens system for grooming the intermediate beam while changing its effective diameter.

17. A system according to claim 16, wherein:
the spatial filter is an aperture disposed at a focal point in the re-collimating lens system.

* * * * *

UNITED STATES PATENT AND TRADEMARK OFFICE
CERTIFICATE OF CORRECTION

PATENT NO.        : 7,050,474 B2                                    Page 1 of 1
APPLICATION NO. : 10/656343
DATED             : May 23, 2006
INVENTOR(S)       : Shan et al.

It is certified that error appears in the above-identified patent and that said Letters Patent is hereby corrected as shown below:

Column 10,
Line 48, after "its" the word should be "beam" - please delete "am" and insert "beam"

Signed and Sealed this

Fifteenth Day of August, 2006

JON W. DUDAS
*Director of the United States Patent and Trademark Office*